United States Patent Office 3,031,493
Patented Apr. 24, 1962

3,031,493
PROCESS FOR THE PRODUCTION OF UNSATURATED CARBOXYLIC ACID ESTERS
Eduard Enk and Fritz Knorr, Burghausen, Upper Bavaria, Germany, assignors to Wacker-Chemie G.m.b.H., Munich, Germany
No Drawing. Filed June 1, 1959, Ser. No. 817,088
Claims priority, application Germany June 3, 1958
11 Claims. (Cl. 260—486)

The present invention relates to an improved process for the production of unsaturated mono-carboxylic acid esters from alpha- or beta-alkoxy or aryloxy substituted mono-carboxylic acid esters employing mixed silica containing catalysts.

It is known that acrylic esters can be prepared by treating beta-alkoxy propionic acid esters in the liquid or gaseous phase with dehydrating agents, such as sulfuric acid (German Patent No. 573,724). Volatile acidic organic sulfur compounds which reduce the stability of the acrylic acid esters produced were produced as by-products in such reaction in view of reduction reactions. Furthermore, the yields obtainable were variable in view of losses engendered by polymerization. In the case of acrylic acid methyl ester the yields attained were between 68.5 and 80%.

The production of alpha-beta unsaturated esters by splitting off alcohol from beta-alkoxy substituted propionic or isobutyric acid esters in the liquid phase in the presence of sodium alcoholate has been described in U.S. Patent No. 2,393,737. It has also been proposed to improve the yields and increase the velocity of the reaction by dissolving the sodium methylate employed as the catalyst in methanol and to permit it to drop into the treated beta-methoxy isobutyric acid methyl ester at the same rate as the methacrylic acid methyl ester which is formed distills off. It was possible in this way to achieve yields of up to 92.5% based upon the beta-methoxy isobutyric acid methyl ester converted. However, the separation of a large excess of methanol from the methacrylic acid methyl ester by extractive or azeotropic distillation is rather costly.

In order to increase the velocity of the conversion, the alkaline cleavage of beta-alkoxy substituted esters with the formation of alpha-beta unsaturated esters was carried out in the gas phase according to U.S. Patent No. 2,457,225 employing basic alkali metal and alkaline earth metal compounds as catalyst. The cleavage product obtained are essentially free of acid but in view of the high temperatures required for the dealcoholysis considerable decomposition of the ester formed occurred which is evidenced by the strong yellow brown coloration of the cleavage product and the deposit of carbon on the catalyst which reduced its activity.

According to the invention it was found that unsaturated mono-carboxylic acid esters can be produced by conversion of alpha- or beta-alkoxy or aryloxy substituted mono-carboxylic acid esters employing mixed silica containing catalysts which contain a finely divided oxide of a metal of groups IVA or VA of the perodic system (according to Pauling, College Chemistry, 1955) or a finely divided alkali metal or alkaline earth metal silicate.

It was found that such catalysts are active at a relatively low temperature without causing any substantial side reactions, whereby the deposition of carbon is diminished or even prevented and the catalyst life is increased. Furthermore, high conversions or respectively high yields of alpha beta unsaturated esters are obtained with such catalysts.

Preferably, according to the invention, mixed catalysts are employed which in addition to silica contains oxides of titanium, zirconium, thorium or tantalum However, oxides of the other metals of groups IVA and VA of the periodic system also produce suitable conversions and yields. It is advantageous when the amount of metal oxides is between 0.1 and 10% of the total weight of the catalyst.

In the case of the mixed catalyst containing silica and alkali metal or alkaline earth metal silicates, those containing sodium, magnesium or calcium silicates are most preferred. However, other silicates, such as, for example, lithium, potassium, strontium or barium silicates, may also be used with good success. The quantity of such silicates in the catalyst can amount to 5 to 30%, preferably 5 to 15%, of the total weight of the catalysts.

The catalysts according to the invention can be successfully employed over a wide range of temperatures up to 400° C. and produce uniformly high conversions and yields. The mixed catalysts of silica and oxides of metals of groups IVA and VA of the periodic system (according to Pauling, College Chemistry, 1955) are effective, for example, between 200 and 400° C. Optimal efficiency is obtained between 270 and 350° C., however, the reduction in efficiency upon exceeding the optimal temperature is slight. The silica and silicate containing catalysts are effective at temperatures between 330 and 400° C. and are preferably employed at temperatures between 370 and 390° C.

In view of the relatively low cleavage temperature required in the process according to the invention, the cleavage products produced are practically colorless.

The process according to the invention can be carried out in the gas or liquid phase and can be carried out continuously or discontinuously. When it is carried out in the gas phase, the vaporized material is passed through a heated tube filled with the catalyst at atmospheric or subatmospheric temperature, preferably admixture with an inert gas, such as nitrogen. The heating of the catalyst tube can be effected by electric heating or with a heated gas which is passed over the tube with a blower to prevent local overheating.

The vapors after the cleavage and condensation are collected in a trap cooled to about 0° C. and the unsaturated mono-carboxylic acid esters are separated from the non-converted starting material and by-products by simple or azeotropic distillation. The components reaction mixture, however, also can be recovered by extractive distillation in a known manner, if desired, with the addition of polymerization inhibitors, such as nitrogen oxides.

When the reaction is carried out in the liquid phase care must be taken to achieve intimate contact between the catalyst and the liquid starting material. This can be achieved by mechanical measures, such as stirring, shaking, spraying or vibration, or by chemical measures which favor the formation of large surface areas. Care must be taken that the reaction product is withdrawn from the reaction chamber as rapidly as possible. The use of superatmospheric pressures promotes the reaction.

The degree of cleavage the ether esters attained in the process according to the invention, whether carried out in the liquid phase or in the gas phase, depends upon the reaction temperature, as well as the quantity of catalyst provided. The quantity of starting material charged to the catalyst per unit of time can be varied within wide limits and can be adapted to the conditions at hand.

Preferably, the alcohols from which the alkoxy and ester groups of the starting alkoxy mono-carboxylic acid esters are derived are alkanols containing 1 to 8 carbon atoms.

The following examples will serve to illustrate a number of embodiments of the process according to the invention.

Example 1

The catalyst was prepared in a known manner by mixing a solution of a chloride of the metal in question, such as titanium or tantalum chloride, in a lower alcohol such as methyl or ethyl alcohol, with an aqueous acid, such as HCl, sufficient for precipitation of the quantity of silica desired. Thereafter, an aqueous sodium silicate solution is added and the precipitate washed and dried at 110° C., preferably in a steam containing atmosphere, and subsequently calcined at about 350° C.

Beta-methoxy propionic methyl ester was passed in vapor form at 270° C. over a catalyst consisting of 99% silica and 1% of finely divided titanium dioxide prepared in the above described manner. The rate at which such ether-ester was passed over the catalyst was 0.37 g. per cc. of catalyst per hour. The conversion amounted to 75.9% based upon the ether-ester passed over the catalyst. The yield of acrylic acid methyl ester was 95.5%. In addition, a 72.2% yield of methanol was obtained based upon the ether-ester converted. The quantity of acrylic acid calculated on acrylic acid+acrylic acid methyl ester was 2.4%. The crude cleavage product was completely colorless.

When the temperature was raised to 300° C. but otherwise using the same reaction conditions, the conversion was 90.9% and the yield of acrylic acid methyl ester based upon the ether-ester converted was 91.3%.

When a catalyst consisting of silica alone was used at 270° C. it exhibited no cleavage action whatsoever.

Example 2

Beta-methoxy propionic methyl ester was passed in vapor form at 270° C. over a catalyst consisting of 99.5% of silica and 0.5% of finely divided zirconium oxide prepared as indicated in Example 1. The rate at which such ether-ester was passed over the catalyst was 0.37 g. per cc. of catalyst per hour. The conversion amounted to 76% based upon the ether-ester passed over the catalyst and the yield of acrylic acid methyl ester was 95%. In addition, a 73% yield of methanol was obtained based upon the ether-ester converted.

Example 3

Beta-methoxy isobutyric acid methyl ester was passed in vapor form at 300° C. over a catalyst consisting of 99.8% of silica and 0.2% of finely divided tantalum oxide prepared as in Example 1. The rate at which such ether-ester was passed over the catalyst was 1.0 g. per cc. of catalyst per hour. The conversion amounted to 82.0% based upon the ether-ester passed over the catalyst. The yield of methacrylic acid methyl ester was 94%. In addition, a 74.7% yield of methanol was obtained based upon the ether-ester converted. The crude cleavage produce was almost colorless. When the reaction temperature was raised to 350° C., the conversion was 89.4% and the yield of methacrylic acid methyl ester was 90.7% based upon the ether-ester converted.

Example 4

Beta-methoxy propionic acid methyl ester was passed in vapor form at a temperature of 380° C. over a catalyst consisting of 95.1% of silica and 4.9% of sodium silicate. The rate at which such ether-ester was passed over the catalyst was 0.37 g. per cc. of catalyst per hour. The conversion amounted to 89.4% based upon the ether-ester supplied to the catalyst. The yield of acrylic acid methyl ester was 90.1%. In addition, a 96% yield of methanol was obtained based upon the ether-ester converted.

Example 5

Alpha-ethyl-beta-methoxy propionic methyl ester was reacted in a shaking autoclave containing a catalyst consisting of 99% of silica and 1% of thorium oxide at a temperature of 300° C. and a pressure of about 200 atmospheres. The conversion amounted to 80% based upon the ether-ester introduced and the yield of alpha-ethyl acrylic acid methyl ester was 96%.

Example 6

Beta-n-butoxy propionic acid-n-butyl ester was passed in vapor form at a temperature of 380° C. over a catalyst consisting of 85% of silica and 15% of magnesium silicate. The rate at which such ether-ester was passed over the catalyst was 0.6 g. per cc. of catalyst per hour. The conversion amounted to 82.0% based upon the ether-ester supplied to the catalyst and the yield of acrylic acid-n-butyl ester was 90.0%. In addition, a 97% yield of n-butanol was obtained based upon the ether-ester converted.

Example 7

Beta-n-butoxy-isobutyric acid-n-butyl ester was passed in vapor form at 380° C. over a catalyst consisting of 90% of silica and 10% of calcium silicate. The rate at which such ether-ester was passed over the catalyst was 0.7 g. per cc. of catalyst per hour. The conversion amounted to 81.0% based upon the ether-ester supplied and the yield of methacrylic acid-n-butyl ester was 89%. In addition, a 96% yield of n-butanol was obtained based upon the ether-ester converted.

Example 8

Beta-(2-ethyl)-butoxy propionic acid-(2-ethyl)-butyl ester was passed in vapor form at 380° C. over a catalyst consisting of 95% of silica and 5% of lithium silicate. The rate at which such ether-ester was passed over the catalyst was 0.5 g. per cc. of catalyst per hour. The conversion amounted to 84% based upon the ether-ester supplied and the yield of acrylic acid-(2-ethyl)-butyl ester was 90.0%. In addition, a 96% yield of 2-ethyl butanol was obtained based upon the ether-ester converted.

Example 9

Beta-methoxy isobutyric acid-n-hexyl ester was passed in vapor form at a temperature of 370° C. over a catalyst consisting of 90% of silica and 10% of barium silicate. The rate at which such ether-ester was passed over the catalyst was 0.6 g. per cc. of catalyst per hour. The conversion amounted to 83% based upon the ether-ester supplied and the yield of methacrylic acid-n-hexyl ester was 90.3%. In addition, a 95% yield of methanol was obtained based upon the ether-ester converted.

Example 10

Alpha-ethyl-beta-methoxy-propionic acid-n-butyl ester was passed in vapor form at a temperature of 370° C. over a catalyst consisting of 92% of silica and 8% of magnesium silicate. The rate at which such ether-ester was passed over the catalyst was 1.0 g. per cc. of catalyst per hour. The conversion amounted to 83.1% based upon the ether-ester supplied and the yield of alpha-ethyl acrylic acid-n-butyl ester was 96.1%. In addition, a 98% yield of methanol was obtained based upon the ether-ester converted.

Example 11

Alpha-isopropyl-beta-methoxy propionic acid methyl ester was passed in vapor form at a temperature of 380° C. over a catalyst consisting of 95% of silica and 5% of sodium silicate. The rate at which such ether-ester was passed over the catalyst was 1.3 g. per cc. of catalyst per hour. The conversion amounted to 79% based upon the ether-ester supplied and the yield of alpha-isopropyl acrylic acid methyl ester was 93.1%. In addition, a 92.0% yield of methanol was obtained based upon the ether-ester converted.

We claim:

1. A process for the production of $\alpha,\beta$-unsaturated monocarboxylic acid esters which comprises contacting a $\beta$-alkoxy monocarboxylic acid ester with a catalyst comprising silica and an oxygen containing compound selected from the group consisting of oxides of metals of groups IVA and VA of the periodic system, alkali metal silicates and alkaline earth metal silicates at a temperature between 200 and 400° C. to form an $\alpha,\beta$-unsaturated monocarboxylic acid ester and an alcohol.

2. The process of claim 1 in which said $\beta$-alkoxy monocarboxylic acid ester is a $\beta$-alkoxy monocarboxylic acid alkyl ester.

3. The process of claim 1 in which said catalyst essentially consists of silica and an oxide of one of the metals of groups IVA and VA of the periodic system and said $\beta$-alkoxy monocarboxylic acid ester is contacted therewith at a temperature between 270 and 350° C.

4. The process in claim 3 in which said catalyst essentially consists of silica and 0.1 to 10% of titanium oxide based upon the total weight of the catalyst.

5. The process of claim 3 in which said catalyst essentially consists of silica and 0.1 to 10% of zirconium oxide based upon the total weight of the catalyst.

6. The process of claim 3 in which said catalyst essentially consists of silica and 0.1 to 10% of thorium oxide based upon the total weight of the catalyst.

7. The process of claim 3 in which said catalyst essentially consists of silica and 0.1 to 10% of tantalum oxide based upon the total weight of the catalyst.

8. The process of claim 1 in which said $\beta$-alkoxy monocarboxylic acid ester is contacted with the catalyst at a temperature between 330 and 400° C. and said catalyst essentially consists of silica and 5 to 30% of an alkali metal silicate based upon the total weight of the catalyst.

9. The process of claim 1 in which said $\beta$-alkoxy monocarboxylic acid ester is contacted with the catalyst at a temperature between 370 and 390° C. and said catalyst essentially consists of silica and 5 to 15% of an alkali metal silicate based upon the total weight of the catalyst.

10. The process of claim 1 in which said $\beta$-alkoxy monocarboxylic acid ester is contacted with the catalyst at a temperature between 330 and 400° C. and said catalyst essentially consists of silica and 5 to 30% of an alkaline earth metal silicate based upon the total weight of the catalyst.

11. The process of claim 1 in which said dealcoholysis is carried out at a temperature between 370 and 390° C. and said catalyst essentially consists of silica and 5 to 15% of an alkaline earth metal silicate based upon the total weight of the catalyst.

References Cited in the file of this patent

UNITED STATES PATENTS

| 2,376,704 | Kung | May 22, 1945 |
| 2,457,225 | Gresham | Dec. 28, 1948 |

OTHER REFERENCES

Burwell, Chem. Rev. 54, 615–685 (1954), pp. 622, 628–629, 638, 660 and 672–673 especially relied on.

Fuson: "Advanced Organic Chemistry," 1950, pp. 95–97.

Pauling: "College Chemistry," 1955, inside front cover.

Berkman et al.: "Catalysis," 1940, pp. 735–746.

Ehret: "Smith's College Chemistry," 6th Edition, 1946, inside rear cover.